United States Patent Office 2,939,897
Patented June 7, 1960

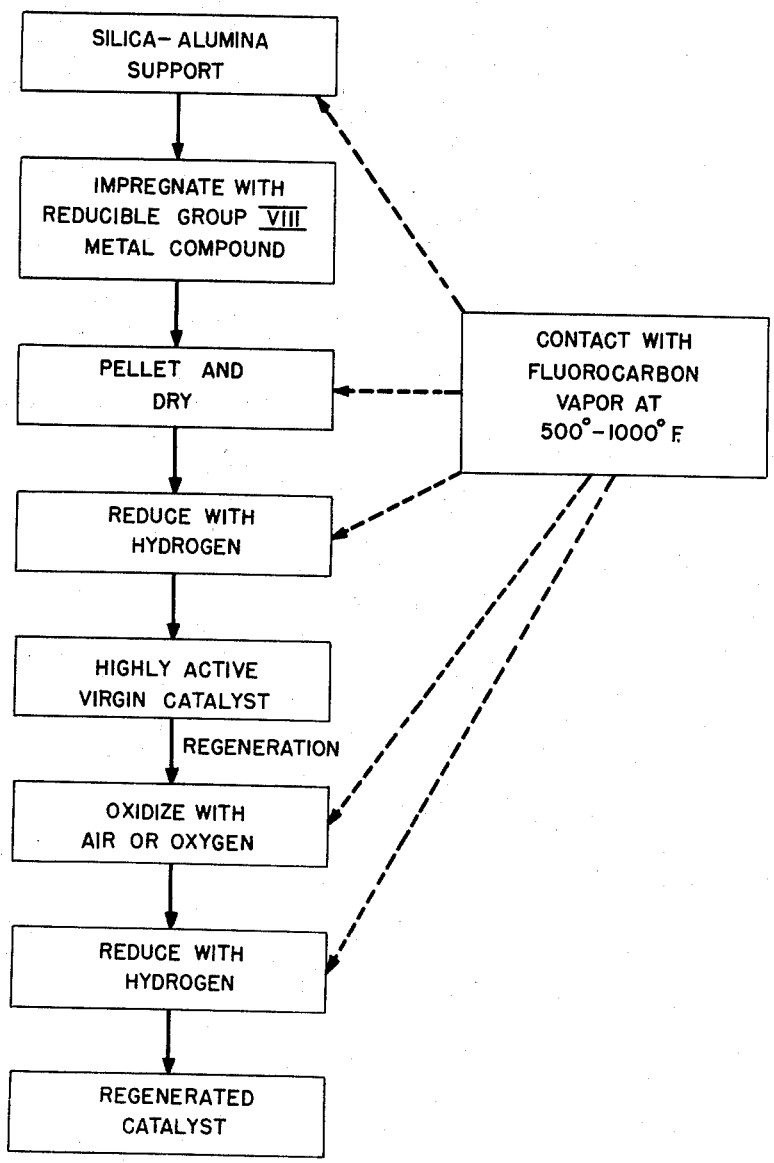

2,939,897
PROCESS AND CATALYST FOR THE ISOMERIZATION OF LIGHT PARAFFIN

Oral L. Beber and Norman L. Carr, Crystal Lake, Ill., assignors to The Pure Oil Company, Chicago, Ill., a corporation of Ohio Filed Aug. 15, 1958, Ser. No. 755,223

15 Claims. (Cl. 260—683.68)

This invention relates to new and useful improvements in processes for the hydroisomerization of normal paraffin hydrocarbons having 4 to 7 carbon atoms per molecule and more particularly to an improved isomerization catalyst and method of preparing the same.

It has been found that the hydroisomerization of hydrocarbon feed stocks consisting predominantly of normal paraffin hydrocarbons having 4 to 7 carbon atoms per molecule can be efficiently carried out by passing the feed stocks over a catalyst under moderate temperature isomerization conditions. When paraffin hydrocarbons are isomerized in this manner, a mixture of hydrogen and the hydrocarbon in a hydrogen/hydrocarbon mol ratio in the range from about 0.5–5.0 is passed over a composite catalyst at a pressure within the range from about 100–1000 p.s.i.g., and a temperature within the range from about 650°–800° F. The most effective composite catalyst for the isomerization of normal paraffin hydrocarbons under the conditions just described consists of an acidic silica-alumina support having deposited thereon a small amount of a hydrogenation component consisting of a Group VIII metal. In accordance with this invention, it has been found that the treatment of the catalyst support with a fluorocarbon vapor, e.g., a "Freon" ($CCl_2F_2$) or other fluorine-containing perhalogenated, low-molecular-weight hydrocarbon, at 500°–1000° F. produces an isomerization catalyst having superior isomerization activity. The high-temperature treatment with the fluorocarbon vapor may be carried out prior to, concomitantly with, or after deposition of the metal hydrogenation component on the catalyst support, or may be combined with an oxidation or reduction step forming a part of a catalyst regeneration procedure.

It is therefore one object of this invention to provide an improved process for the preparation of a highly active isomerization catalyst.

Another object of this invention is to provide a highly active isomerization catalyst capable of effecting the isomerization of low-molecular-weight normal paraffins to isoparaffins in high yield.

Another object of this invention is to provide an improved process for the regeneration of an isomerization catalyst.

A still further object of this invention is to provide an improved process for the isomerization of hydrocarbon feed stocks consisting predominantly of low-molecular-weight normal paraffins.

A feature of this invention is the provision of a process for treating an isomerization catalyst consisting of a hydrogenation agent supported on a silica-alumina cracking catalyst, in which the catalyst support is treated with the vapors of a fluorocarbon or a fluorine-containing, perhalogenated, low-molecular-weight hydrocarbon at a temperature of 500°–1000° F. to produce a highly active catalyst.

Another feature of this invention is the provision of an improved isomerization catalyst consisting of a small amount of a Group VIII metal hydrogenation agent supported on silica-alumina, containing 50–95% silica, which has been treated at 500°–1000° F. by contact with a small amount of a fluorine-containing, perhalogenated, low-molecular-weight hydrocarbon.

A further feature of this invention is the provision of an improved process for the isomerization of normal paraffin hydrocarbons in which said hydrocarbons are passed with hydrogen at an elevated pressure, and a temperature in the range of about 650°–800° F., over a catalyst prepared or regenerated in accordance with the improved procedures of this invention.

Other objects and features of this invention will become apparent from time to time throughout the specification and claims as hereinafter related.

In the accompanying drawing, there is shown a flow diagram of our improved method for preparing, activating, or regenerating an isomerization catalyst.

According to this invention, it has been found that the effectiveness of a composite isomerization catalyst, consisting of an acidic silica-alumina suppport impregnated with a Group VIII metal hydrogenation agent, may be substantially enhanced by treating the catalyst support with a fluorocarbon vapor at 500°–1000° F. The fluorocarbon which may be used is preferably a "Freon," such as difluorodichloromethane, trichlorofluoromethane, chlorotrifluoromethane, trichlorotrifluoroethane, although other fluorine-containing perhalogenated hydrocarbons, such as carbon tetrafluoride, perfluoroethane, perfluoropropane, or perfluorobutane, can be used. The fluorocarbon which is used is contacted with the catalyst at a temperature of 500°–1000° F. in admixture with a diluent gas, e.g., nitrogen, hydrogen, or oxygen, in a concentration varying from as little as 1 or 2 parts per million to as much as 10% by volume. The treatment of the catalyst support with the fluorocarbon vapor may be prior to, concomitant with, or subsequent to the depositiion of the metal hydrogenation agent on the support. Also, the treatment may be combined with one of the steps of a regeneration procedure for reactivation of a catalyst which has become fouled after extended use.

When a catalyst is prepared, activated, and treated with a fluorocarbon vapor in the manner described hereinafter, the catalyst is found to have a substantially greater isomerization activity than a catalyst which has not received such treatment. This treatment may be applied to the catalyst support prior to the impregnation of the support with the metal hydrogenation agent. The treatment may also be given by incorporating the fluorocarbon with the hydrogen which is used to reduce the metal compound with which the catalyst is impregnated to a highly active, free metal, or may be applied to the activated virgin catalyst after the reduction step. The treatment with fluorocarbons at elevated temperatures may also be used in the regeneration of a catalyst which has become fouled after extended or improper use. The fluorocarbon may be used in the air or oxygen with which a fouled catalyst is oxidized for eliminating carbon deposits. Also, the fluorocarbon may be used in the hydrogen with which an oxidized catalyst is reduced in the final step of regenerating a fouled catalyst. This procedure is applicable for enhancing the isomerization activity of isomerization catalysts in which a Group VIII metal is deposited on an acidic silica-alumina support. Catalysts which may be subjected to this treatment include nickel, nickel molybdate, platinum, palladium, rhodium, etc. on an acidic silica-alumina support.

The following non-limiting examples illustrate the preparation, activation, and regeneration of isomerization catalysts in accordance with this invention.

Example I

A commercial silica-alumina cracking catalyst, containing 75% silica and 25% alumina, is dried at 400° F. for a period of 3 hours, to a water content of about 15–25 wt. percent. A 250 g. portion of the catalyst support is impregnated with 250 cc. of an aqueous solution containing 0.35 wt. percent palladium nitrate. The amount of solution used is completely absorbed in the pores of the catalyst support and converts the same to a smooth thick paste. The impregnated catalyst mass is then formed into pellets ⅛" in diameter and dried at 230° F. for 10 hours. The catalyst is activated by heating at 975° F. in a current of hydrogen containing one part per million of dichlorodifluoromethane for a period of 8 hours to reduce the palladium salt to metallic palladium in a highly active form. After reduction with hydrogen, the catalyst pellets contain 0.35 wt. percent palladium metal in a highly active form. This catalyst is used in isomerizing hydrogen and n-pentane at temperatures in the range of about 650°–800° F., pressures in the range of 100–1000 p.s.i.g., and liquid volume hourly space velocities in the range of 0.5–10.0, and effects isomerization at reaction rates up to about 20% greater than the reaction rate effected with a catalyst of the same composition which has not been subjected to treatment with dichlorodifluoromethane.

*Example II*

A catalyst consisting of 0.40 wt. percent palladium on a silica-alumina support, containing 87% silica and 13% alumina, is prepared following the same procedure as described in Example I, except that the dichlorodifluoromethane is omitted from the hydrogen. The reduced catalyst is treated with nitrogen containing 10 parts per million of dichlorodifluoromethane for a period of one hour at 700° F. The catalyst which is produced has an isomerization activity about 25% greater than a catalyst which is not subjected to said treatment.

*Example III*

A commercial silica-alumina cracking catalyst, containing 75% silica and 25% alumina, is dried at 700° F. for a period of 3 hours in a stream of nitrogen containing 5 parts per million trifluorotrichloroethane. This catalyst support is then treated with an aqueous solution containing 0.48% palladium, as palladium chloride, and formed into ⅛" pellets. The catalyst pellets are dried at 230° F. for 6 hours and activated by heating at 975° F. in a current of hydrogen for a period of 8 hours to reduce the palladium salt to metallic palladium in a highly active form. After reduction with hydrogen, the catalyst pellets contain 0.48 wt. percent palladium metal. This catalyst is about 20% more active in isomerizing n-pentane than a catalyst of the same composition which has not been subjected to the preliminary treatment with trichlorotrifluoroethane.

*Example IV*

An isomerization catalyst consisting of 3% reduced nickel molybdate on 75/25 silica-alumina which has become fouled after extended use in the isomerization of n-pentane is subjected to an oxidation and reduction regeneration procedure. The catalyst is oxidized with air containing 10 parts per million of dichlorodifluoromethane at 850° F. for a period of 3 hours. The oxidized catalyst is then reduced with hydrogen at 950° F. for a period of 8 hours. After reduction with hydrogen, the catalyst is restored to an activity which is higher than a virgin catalyst of the same composition. When a nickel-molybdenum catalyst is regenerated in this manner, the catalyst reaches a level of activity which is higher than a catalyst regenerated by an oxidation and reduction cycle which does not include a small amount of dichlorodifluoromethane in either the oxidizing or the reduction gas.

*Example V*

In another embodiment of this invention, 26 g. of a catalyst consisting of 0.48 wt. percent palladium on 87/13 silica-alumina was oxidized with air at 800° F. for a period of 2 hours. The catalyst was then treated with approximately 0.5 g. of dichlorodifluoromethane dispersed in a nitrogen-air mixture (lean in air) to a concentration of about 10 parts per million, for a period of about ½ hour. The catalyst was then purged thoroughly and reduced by contact with hydrogen at 975° F. The oxidation step of this process oxidizes and removes contaminates such as carbon which have become deposited on the catalyst during extended use. The reduction step reconverts the palladium metal to a highly active metallic form. This catalyst after regeneration in the manner above-described was contacted with normal pentane and hydrogen at a temperature of 760° F., a pressure of 600 p.s.i.g., a hydrogen/n-pentane mol ratio of 2.3, and a liquid volume hourly space velocity of 9.8. Under these reaction conditions, there was a 38.8 volume percent conversion of normal pentane, producing isopentane in a 35.2 volume percent yield, and an isopentane selectivity of 91.2%. The effectiveness of this catalyst was compared with another untreated catalyst by comparison of the reaction rate constants for isomerization reaction using these catalysts. The reaction rate constant $k$ is defined by the equation (for pure n-$C_5$ feed):

$$k = (LVHSV) \ln \left[ \frac{1}{1 - \frac{x}{x_e}} \right]$$

where $x_e$=equilibrium yield of isopentane (0.62 at 760° F.) and $x$=actual yield of isopentane, also expressed as a fraction. The reaction rate constant for this catalyst was 8.8.

A portion of the same catalyst used in this example was regenerated following the same technique but omitting the dichlorodifluoromethane treatment. The regenerated catalyst, after oxidation with air and reduction with hydrogen, was evaluated for its activity in the isomerization of n-pentane. The reaction rate constant using this untreated catalyst was calculated, using the above-mentioned formula, and found to be only 6.8. Thus, the catalyst which was regenerated and subjected to high temperature treatment with dichlorodifluoromethane was about 30% more active than the regenerated catalyst which was not subjected to treatment with dichlorodifluoromethane.

From the foregoing examples, it is seen that a substantial improvement in isomerization activity of an isomerization catalyst can be effected by treating the catalyst support with a fluorocarbon vapor, e.g., dichlorodifluoromethane, chlorotrifluoromethane, trichlorofluoromethane, carbon tetrafluoride, or trichlorotrifluoroethane, at a temperature of 500°–1000° F. The improvement in catalyst activity is realized regardless of the stage during which the treatment is carried out. Thus, the treatment of the catalyst support may precede the impregnation of the support with a Group VIII metallic hydrogenation agent, or it may coincide with a subsequent drying step, or it may be combined with the hydrogen reduction step in which the Group VIII metal compound is reduced to a highly active metal. Also, the fluorocarbon high-temperature treatment may be used in conjunction with the regeneration of a catalyst after extended use. In such a case, the fluorocarbon vapor is incorporated in the air or oxygen used to oxidize the catalyst, or in the hydrogen used to reduce the oxidized catalyst.

While we have described our invention fully and completely as required by the patent statutes, with special emphasis upon several preferred embodiments, we wish it understood that within the scope of the appended claims this invention may be practiced otherwise than as specifically described.

What is claimed is:

1. The method of preparing a highly active hydrocarbon isomerization catalyst which comprises contacting a silica-alumina catalyst support, containing at least 50 wt. percent silica, with a fluorine-containing perhalogenated hydrocarbon at a temperature in the range of about 500°–1000° F., impregnating the catalyst support with a reducible compound of a Group VIII metal hydrogenation agent, and reducing said metal hydrogenation agent with hydrogen at 750°–975° F.

2. A method in accordance with claim 1 in which the hydrogenation agent is of the group consisting of nickel, nickel compounds, and Group VIII noble metals.

3. A method in accordance with claim 1 in which the hydrogenation agent is palladium and the perhalogenated hydrocarbon is of the formula $CCl_xF_y$, where $x$ and $y$ are small integers which total 4.

4. A method in accordance with claim 3 in which the catalyst support is contacted with the perhalogenated hydrocarbon prior to impregnation with the hydrogenation agent.

5. A method in accordance with claim 3 in which the catalyst support is contacted with the perhalogenated hydrocarbon subsequent to impregnation with the hydrogenation agent.

6. A method in accordance with claim 3 in which the perhalogenated hydrocarbon is used in admixture with a diluent gas.

7. A method in accordance with claim 3 in which the perhalogenated hydrocarbon is dichlorodifluoromethane.

8. A method of regenerating a hydrocarbon isomerization catalyst consisting essentially of a silica-alumina support, containing at least 50 wt. percent silica, and 0.01–1.0% of a Group VIII metal hydrogenation agent, which comprises oxidizing said catalyst with oxygen to remove impurities, contacting the oxidized catalyst with a fluorine-containing perhalogenated hydrocarbon at a temperature of 500°–1000° F., and reducing the catalyst with hydrogen at a temperature of about 750°–975° F.

9. A method in accordance with claim 8 in which the hydrogenation agent is palladium and the perhalogenated hydrocarbon is dichlorodifluoromethane.

10. A catalyst prepared in accordance with claim 1.

11. A catalyst prepared in accordance with claim 3.

12. A catalyst prepared in accordance with claim 7.

13. A method of isomerizing $C_4$–$C_7$ normal paraffin hydrocarbons which comprises passing hydrogen and a normal paraffin hydrocarbon at a temperature in the range of about 650°–800° F., sufficient to effect isomerization, a pressure in the range of about 100–1000 p.s.i.g., a liquid volume hourly space velocity in the range of about 0.5–10.0, and a hydrogen/hydrocarbon mol ratio within the range of about 0.5–5.0, over a catalyst prepared in accordance with claim 1.

14. A method of isomerizing $C_4$–$C_7$ normal paraffin hydrocarbons which comprises passing hydrogen and a normal paraffin hydrocarbon at a temperature in the range of about 650°–800° F., sufficient to effect isomerization, a pressure in the range of about 100–1000 p.s.i.g., a liquid volume hourly space velocity in the range of about 0.5–10.0, and a hydrogen/hydrocarbon mol ratio within the range of about 0.5–5.0, over a catalyst prepared in accordance with claim 3.

15. A method of isomerizing $C_4$–$C_7$ normal paraffin hydrocarbons which comprises passing hydrogen and a normal paraffin hydrocarbon at a temperature in the range of about 650°–800° F., sufficient to effect isomerization, a pressure in the range of about 100–1000 p.s.i.g., a liquid volume hourly space velocity in the range of about 0.5–10.0, and a hydrogen/hydrocarbon mol ratio within the range of about 0.5–5.0, over a catalyst prepared in accordance with claim 7.

References Cited in the file of this patent

UNITED STATES PATENTS

| | | |
|---|---|---|
| 2,550,531 | Ciapetta | Apr. 24, 1951 |
| 2,642,384 | Cox | June 16, 1953 |
| 2,792,337 | Engel | May 14, 1957 |
| 2,856,349 | Love | Oct. 14, 1958 |

FOREIGN PATENTS

| | | |
|---|---|---|
| 487,392 | Canada | Oct. 21, 1952 |
| 538,991 | Canada | Apr. 2, 1957 |